Jan. 17, 1933. J. WAHL 1,894,648
PRESSURE GAUGE
Filed March 5, 1930
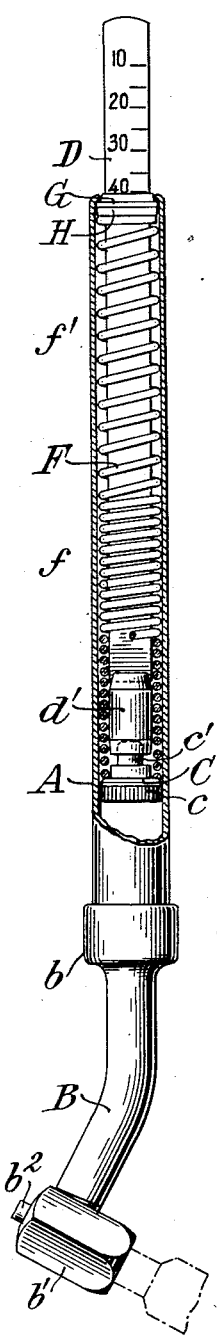
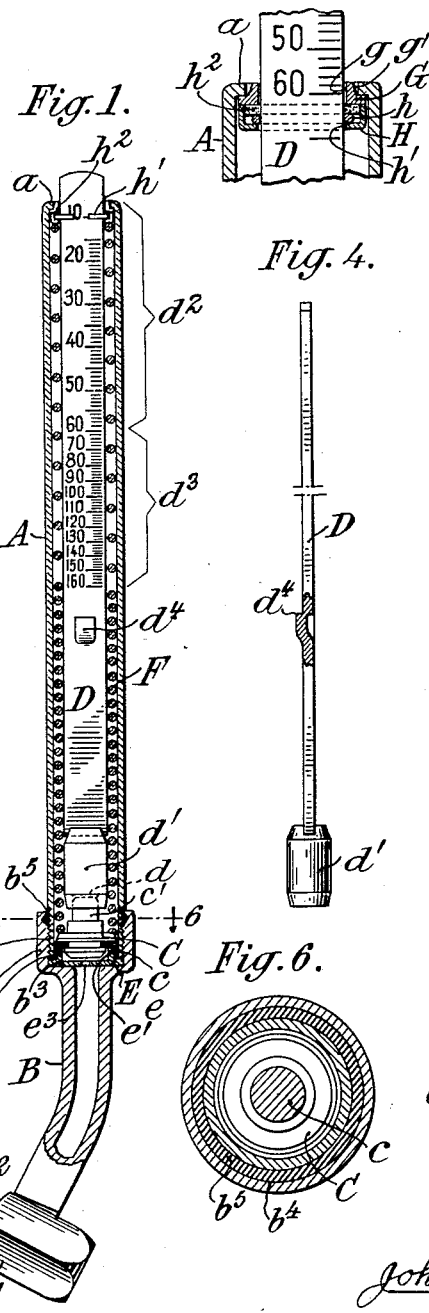
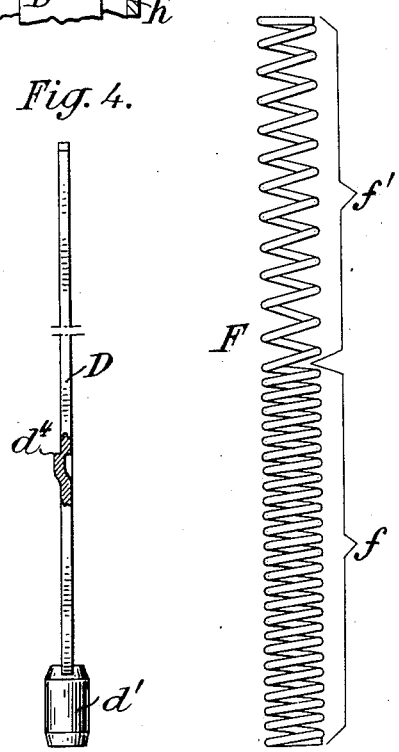
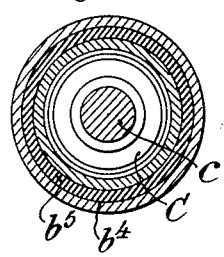
INVENTOR
John Wahl,
By Attorneys,
Fraser, Myers & Manley Patented Jan. 17, 1933

1,894,648

UNITED STATES PATENT OFFICE

JOHN WAHL, OF ROSEDALE, NEW YORK, ASSIGNOR TO A. SCHRADER'S SON, INCORPORATED, OF BROOKLYN, NEW YORK, A CORPORATION OF NEW YORK

PRESSURE GAUGE

Application filed March 5, 1930. Serial No. 433,372.

The present invention relates to pressure gauges, and more particularly to tire pressure gauges of the telescoping indicating member type, and aims to provide certain improvements therein.

In ascertaining tire pressures according to the present practice, two separate gauges are employed; one for the relatively low pressures to which balloon tires are inflated, and another for the higher pressures to which the so-called high pressure tires are inflated. Of course the motorist naturally provides himself with a gauge having the pressure range of the type of tire on his car. At service stations, however, the operator must rely on two separate gauges, which not only necessitates carrying two gauges on his person, but often provokes vexation when he withdraws the wrong gauge to take a tire pressure reading.

According to the present invention I provide a pressure gauge which eliminates the need and inconvenience of using two separate gauges. This gauge may be termed a service station gauge, as it is capable of measuring both the relatively low pressures used in balloon tires, and the higher pressures employed in high pressure tires, with the same degree of accuracy now realized with separate gauges, and is usable in precisely the same manner as the conventional tire pressure gauge.

According to the present invention I provide a tire pressure gauge of the telescoping indicating member type which comprises a tubular casing, an indicating member telescoping with said casing, and pressure responsive element movable in said casing and adapted when subjected to fluid pressure to move the indicating member to indicating position, said indicating member having indicia embracing a plurality of pressure ranges and a spring for resisting movement of the pressure responsive means when subjected to fluid pressure, the resistance of said spring up to a certain point governing one pressure range of the gauge, and the resistance beyond said point governing a second pressure range. The invention also embodies other features of novelty which will be hereinafter more fully described.

A preferred embodiment of my invention is shown in the accompanying drawing, wherein Figure 1 is a longitudinal section through a gauge embodying my invention, the press-on foot of the gauge being shown in elevation.

Fig. 2 is a view similar to Fig. 1, showing the indicating member in indicating position.

Fig 3 is an elevation of the gauge spring in normal condition.

Fig. 4 is a side elevation partly in section of the indicating member of the gauge.

Fig. 5 is a fractional longitudinal section on an enlarged scale, showing a detail of the invention.

Fig. 6 is a transverse section taken substantially along the plane of the line 6—6 of Fig. 1.

Fig. 7 is a fractional section on an enlarged scale of another detail of the invention.

Referring to the drawing let A indicate a cylindrical casing. which, for the purpose of economy may be made of tubular stock, one end of said casing being flanged inwardly to provide an overhanging lip $a$, and at its opposite end is externally screw-threaded, as shown at $a'$, and engages within an internally screw-threaded bushing $b$ on a fitting B which is provided with a conventional tire press-on seat and deflating pin (not shown) fitted within the foot portion $b'$ for engaging and forming a leak-tight joint with the top of a tire valve when the foot portion is applied thereto. At the top or rear of the foot portion $b'$ there is provided a teat or projection $b^2$, which may function as a tire deflating pin when it is desired to vent air from a tire.

Within the casing A there is provided a pressure responsive means or piston C which carries on its underside a cupped, compressible packing $c$ which is adapted to engage the inner wall of the casing and provide a leak-tight seal therewith, and on its upper side is provided with a reduced cylindrical projection $c'$ for engagement with the bottom wall $d$ of an enlargement $d'$ carried by the lower end of the pressure indicating member or bar D.

To always insure a proper leak-tight contact between the packing $c$ and the inner wall of the casing A, I provide within the casing and preferably at the inner end thereof, and as herein shown in contact with the base $b^3$ of the bushing $b$, a disk-like member E which is clamped against said base by the inner end of the casing A engaging around a shoulder $e$ of the disk E. The disk E is formed on its upper face with a circumferential rib $e'$, the outer face of which tapers inwardly toward its outer end to provide a conical surface $e^2$ which is adapted to engage the inner wall of the packing $c$ and press the same outwardly as said packing rides over and seats against said conical seat when pressed thereagainst by the force of the gauge loading spring F. A central opening $e^3$ is provided in the base of the disk E to permit the passage of air from a tire into the gauge to act upon the piston therein.

Loosely positioned within the casing at its top is a cap closure element or disk G having a diameter slightly greater than the internal diameter of the inturned lip $a$ so that the disk G cannot pass therethrough. Said disk is formed with an opening $g$ of similar contour with the gauge bar D and through which the latter is adapted to freely move, said opening $g$ being flanked by a struck-up flange $g'$ which serves as a guide for the gauge bar and an aid for reading the indicia thereon. Also positioned within the casing below the disk G is a second disk H which is cupped to provide a shallow recess, as best shown in Fig. 5. Within said cup is positioned a split spring ring $h$ having a contour which will prevent its passage through the opening in the disk G and which is adapted to frictionally engage the side edges of the gauge bar or indicating member D to hold the same in any position to which said gauge bar is projected by the piston after the said piston has returned to its normal or zero position.

From the foregoing description it will be seen that the spring F normally maintains the piston in zero position and the closure cap G at the outer end of the casing, and as the disks G and H are loosely positioned within the casing and held against the inturned lip $a$ merely by spring pressure, it will be apparent that said disks will be free to rotate within the casing when a gauge bar is rotated. A swivel connection between the gauge bar and the casing is thus provided. The detailed description of the gauge as thus far given is substantially the same as that disclosed in my application Serial No. 399,200, filed October 12, 1929, and upon which the present invention is an improvement.

According to the present invention the gauge is designed for dual use on both balloon and so-called high pressure tires, and to render said gauge adaptable for such dual purpose I provide a novel construction of spring means for resisting movement of the pressure responsive member, said spring means being so constructed that when subjected to deformation up to a certain point said deformation will be proportional to one pressure range of the gauge; and when subjected to further deformation, such deformation will be proportional to another pressure range of the gauge. The spring construction is also such that unit pressure deformation of the spring within each of its pressure ranges will be equal, but unequal in the different pressure ranges. This permits of the calibration of the gauge bar into pressure ranges, or, in other words, permits the gauge bar for one pressure range to be equally divided and marked in a certain arithmetical progression, and another portion or pressure range in a different arithmetical progression.

The spring F, by means of which I accomplish the advantages set forth in the preceding paragraph, is of the helical coil type formed of a wire of uniform cross-section coiled into convolutions of uniform diameter, which convolutions, for approximately one-half the length of the spring $f$, are more closely spaced apart than in the other half $f'$ with the convolutions in the portion $f$ equally spaced apart and those in the portion $f'$ also equally spaced apart, but a distance different from the spacing in the portion $f$. Under compression the entire spring F will uniformly yield proportionally to the applied pressure. At a predetermined pressure, in the present instance 60 lbs. per square inch, the convolutions of the portion $f$ will be compressed into completely abutting relation so that upon the spring being subjected to additional pressure, only the portion $f'$, which is already under considerable compression, will be brought into active play. Because of this direct proportional relationship between the pressure and the compression of the spring, the gauge bar D can be calibrated into the two pressure ranges, namely, $d^2$, from zero to 60, and $d^3$, from 60 to 160. Obviously, the grouping of the differently spaced convolutions of the spring may be differently arranged without affecting its operation, but as a practicable proposition it is easier to form a spring as shown in the drawing. For preventing movement of the gauge bar through the top of the casing beyond its pressure indicating range, it is formed with a stop or abutment $d^4$ by depressing a portion of the metal of the gauge bar out of its normal planes, as best shown in Figs. 1 and 4.

Repeated movement of the gauge bar D through the top of the casing, in which movement it must pass through the opening $g$ in the disk G and through the opening $h'$ in the disk H, as well as have sliding frictional contact with the spring $h$, in the course of time, will wear upon the side edges of the gauge bar D to roughen the same thereby increasing the resistance to movement of the piston and apt to introduce a source of error in the indicated pressure. Although means have been provided for compensating such errors in gauges, I propose to eliminate this source of error, and accordingly introduce into the gauge casing and preferably within the cup H, lubricating means in the nature of an absorbent or porous disk $h^2$ which is saturated with a lubricant such as oil or graphite. The disk $h^2$ is provided with an opening through which the gauge bar D passes, the walls of said opening contacting with the outer walls of the indicating member.

For providing a leak-tight seal between the inner end of the casing A with the fitting $b$ and supplementing the engagement between the end of said casing A with the disk E, I form the fitting $b$ with an internal annular groove $b^4$ above the internal threads therein, and provide within said groove a compressible packing $b^5$, the internal diameter of which is slightly smaller than the external diameter of the casing A, so that when the latter is screw-threaded into the fitting $b$ the packing $b^5$ will be compressed into engagement with the threaded end $a'$ of the casing to provide a leak-tight joint.

While I have shown and described a preferred embodiment of my invention I do not wish to be limited to the details of construction disclosed, since the same may be modified without departing from the spirit of the invention.

What I claim is:

1. A pressure gauge comprising a casing, pressure responsive means within said casing, pressure indicating means operable by the movement of the pressure responsive means and means in communication with the interior of the casing for connection with a source of fluid pressure to be gauged, said pressure indicating means having indicia embracing a plurality of pressure ranges, and a helical spring for resisting movement of the pressure responsive means when subjected to fluid pressure, the convolutions of the spring for different portions of its length being differently spaced.

2. A pressure gauge comprising a casing, pressure responsive means within said casing, pressure indicating means operable by the movement of the pressure responsive means and means in communication with the interior of the casing for connection with a source of fluid pressure to be gauged, said pressure indicating means having indicia embracing a plurality of pressure ranges, and a helical spring for resisting movement of the pressure responsive means when subjected to fluid pressure, the convolutions of the spring for approximately one-half its length being more closely spaced than for the other half.

3. A pressure gauge comprising an elongate casing having a fluid pressure inlet at one end, pressure responsive means within said casing, pressure indicating means operable by the outward movement of the pressure responsive means, said indicating means having indicia embracing a plurality of pressure ranges for the gauge, and a helical compression spring within said casing for resisting movement of the pressure responsive means when subjected to fluid pressure, the convolutions of the spring for different portions of its length being more closely spaced in one portion than in another, at least one of said portions of the spring upon being subjected to the maximum pressure of the first pressure range of the gauge being adapted to become completely compressed and provide an abutment for the adjacent portion of the spring.

4. A pressure gauge comprising an elongate casing having a fluid pressure inlet at one end, pressure responsive means within said casing, pressure indicating means operable by the outward movement of the pressure responsive means, said indicating means having indicia embracing a plurality of pressure ranges for the gauge, and a helical compression spring within said casing for resisting movement of the pressure responsive means when subjected to fluid pressure, the convolutions of the spring for different portions of its length being more closely spaced in one portion than in another but equally spaced apart in each portion, the portion of said spring having the most closely spaced convolutions, upon being subjected to the maximum pressure of the first pressure range of the gauge, being adapted to become completely compressed and provide an abutment for the next portion of the spring.

5. A pressure gauge comprising an elongate casing having a fluid pressure inlet at one end, pressure responsive means within said casing, pressure indicating means operable by the outward movement of the pressure responsive means, said indicating means having indicia embracing a plurality of pressure ranges for the gauge, and a helical spring within said casing for resisting movement of the pressure responsive means when subjected to fluid pressure, said spring being formed of wire of uniform cross-section and having convolutions of uniform diameter, said convolutions for different portions of the length of the spring being more closely spaced in one portion than in another.

6. As an article of manufacture, a helical coil spring formed of wire of uniform cross-section and convolutions of uniform diameter, and having its convolutions for different portions of the length of the spring more closely spaced apart than in another, the convolutions in any portion being equally spaced from each other.

7. As an article of manufacture, a helical coil spring formed of wire of uniform cross-section and convolutions of uniform diameter, and having its convolutions for approximately one-half its length more closely spaced than for the other half with the convolutions in each half equally spaced apart.

8. A pressure gauge for pneumatic tires or the like, comprising an elongate casing having a fluid pressure inlet at one end and an opening in its other end, pressure responsive means movable in said casing, an indicating member movable by said pressure responsive means through the opening in the end of the casing, means for guiding said indicating member through said opening and lubricating means held within said casing below the open end thereof for engaging the walls of the indicating member.

9. A pressure gauge for pneumatic tires or the like, comprising an elongate casing having a fluid pressure inlet at one end and an opening in its other end, pressure responsive means movable in said casing, a non-circular indicating member movable by said pressure responsive means through the opening in the end of the casing, means for guiding said indicating member through said opening and a lubricated wiper held within the casing below the open end thereof in contacting position with the wall of the indicating member.

10. A pressure gauge for pneumatic tires or the like, comprising a cylindrical casing having a fluid pressure inlet at one end and an opening at its other end whereat it is formed with an inwardly overhanging lip, a piston movable in said casing, an indicating member movable by but disconnected from said piston, a circular closure cap loosely positioned within the opening formed by the overhanging lip and having an opening corresponding to the cross-sectional form of the indicating member which passes therethrough, a disk adjacent the closure cap provided with resilient means in engagement with the edges of the indicating member and adapted to hold said member at any position to which it is moved by the piston, a disk of lubricant containing material having an opening through which the indicating member passes and with which the outer wall of the indicating member engages supported below the closure cap, and a spring within the casing bearing at one end against the piston and at its other end against the disk adjacent the closure cap.

In witness whereof, I have hereunto signed my name.

JOHN WAHL.